May 19, 1959  J. BARTLETT  2,887,134
STUMP REMOVING MACHINE
Filed Aug. 28, 1958  3 Sheets-Sheet 1

INVENTOR
Jack Bartlett
BY Mason & Mason
ATTORNEYS

May 19, 1959 J. BARTLETT 2,887,134
STUMP REMOVING MACHINE
Filed Aug. 28, 1958 3 Sheets-Sheet 2
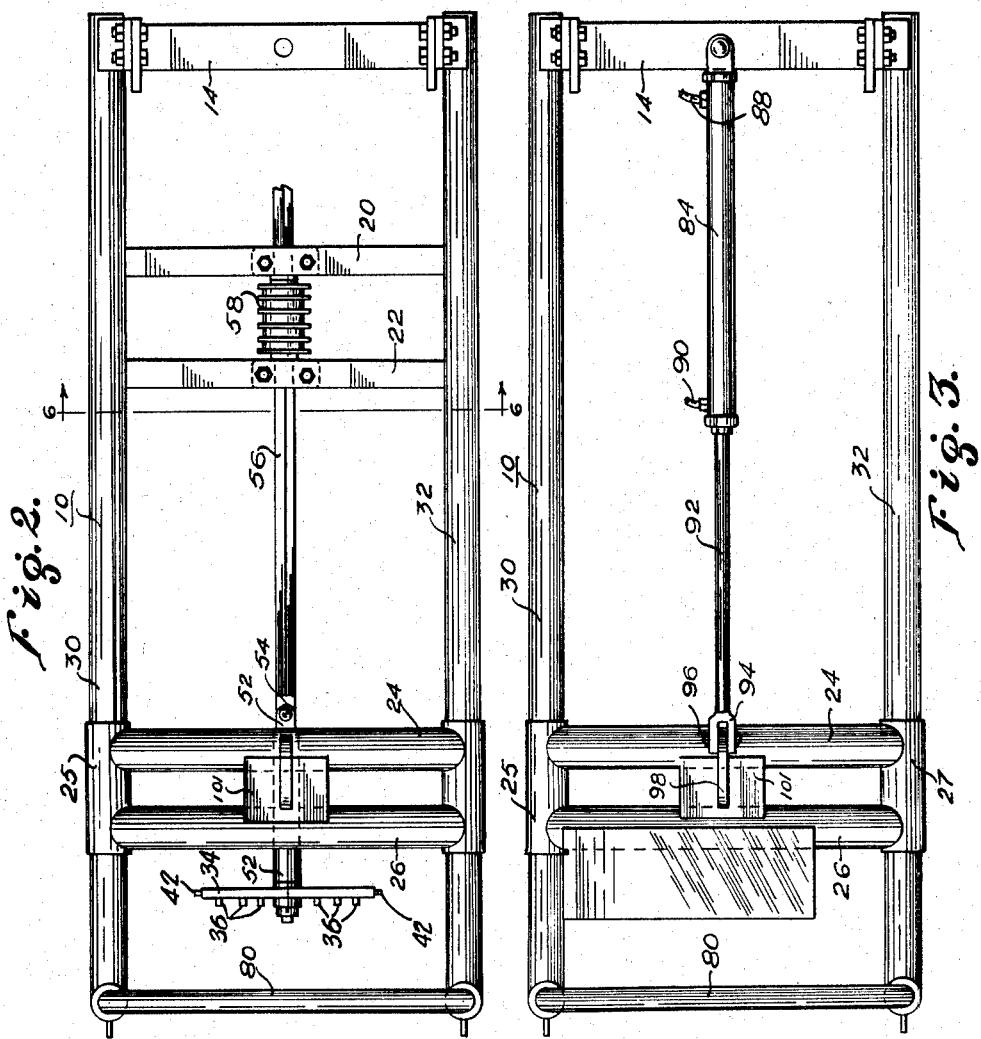
INVENTOR
Jack Bartlett
BY
ATTORNEYS May 19, 1959  J. BARTLETT  2,887,134
STUMP REMOVING MACHINE
Filed Aug. 28, 1958  3 Sheets-Sheet 3

INVENTOR
Jack Bartlett
BY Mason & Mason
ATTORNEYS

United States Patent Office 2,887,134
Patented May 19, 1959

2,887,134

STUMP REMOVING MACHINE

Jack Bartlett, Wynne, Ark.

Application August 28, 1958, Serial No. 757,824

9 Claims. (Cl. 144—2)

The present invention relates to a machine for removing stumps, the top surfaces of which are either located at approximately the surfaces of the ground or above the surface of the ground, comprising a stump removing or macerating mechanism forming an attachment for a tractor.

In areas where trees have been cut down and the stump is level with the ground or is above the ground, it is impossible to cultivate the land in row crops. The only crops that can be grown are seed crops, such as rice, wheat, oats, etc. Should the farmer desire to use the land for row crops, ordinarily it would be necessary to wait until the stumps have decayed enough for easy removal. The existence of stumps in fields raises the question of repair of machinery, such as plows, disks, and combines, with respect to damage as a result of use in fields where stumps remain, such repairs being expensive. Moreover, the operator of a tractor in fields having stumps is subject to much discomfort, due to the fact that the tractor is continuously "bumping" over said stumps.

One of the objects of the present invention is to provide a machine for removing stumps which is adapted to be attached to a tractor of conventional type, and which may be operated by one man.

Another object is the provision of a stump eliminator which has a cutting disk that macerates or cuts the wood into sawdust, and which leaves a very small cavity in the ground, such that it is unnecessary to fill the cavity and wherein it is possible to do whatever leveling is necessary immediately and proceed with the cultivation of the row crops.

A further object is to provide a machine which will disintegrate one stump after another in the field by reducing each stump to small particles, such as sawdust, the machine comprising a disk having cutting teeth and provided with means for supporting the cutting teeth whereby the teeth can be removed for sharpening or replacement purposes.

Yet another object is to provide a machine of this type which may be used for various types of work that may include removing stumps from a field or from a highway right-of-way, or that may be used for removing stumps in cities, to thereby obviate the use of dynamite for said stumps.

A further object is to provide a tractor attachment which mounts a cutting disk, which disk lies in a substantially vertical plane transverse to the line of travel of the tractor, and fluid means for advancing the disk whereby the same may be gradually moved into the stump. The stump is ground into small particles, or sawdust, the said tractor attachment including means operated from the tractor for elevating or lowering the tractor attachment as the tractor travels over the ground.

Other objects will appear hereinafter throughout the specification.

In the drawings:

Figure 2 is a top plan view of the attachment showing the driving means for the cutting disk, with the disk elevating mechanism omitted;

Figure 3 is a top plan view similar to Figure 2 showing the cutting disk elevating mechanism;

Figure 1:
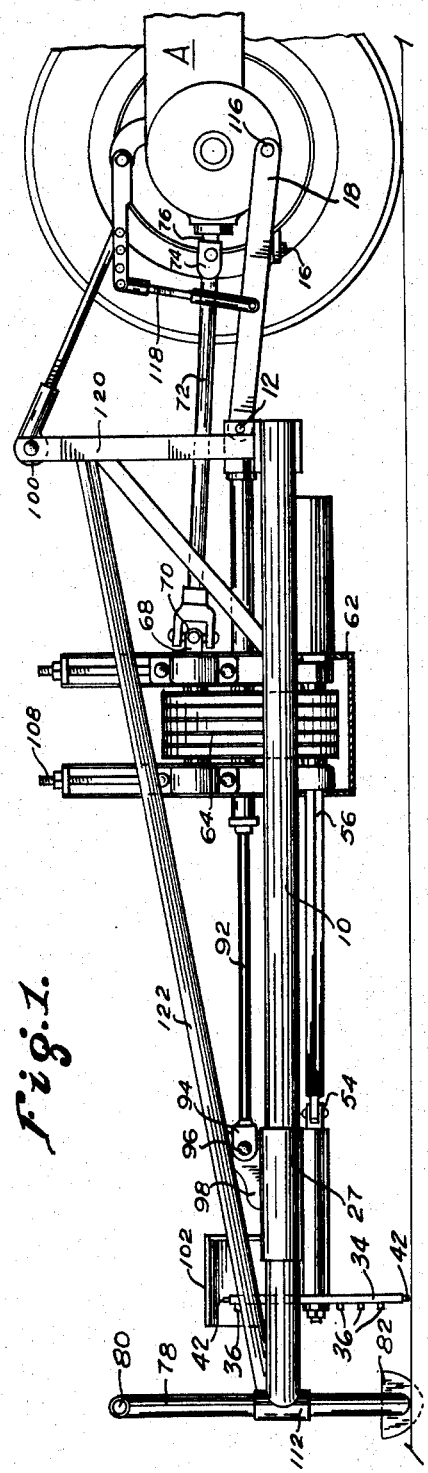
Figure 1 is a side elevational view of a conventional tractor with the stump removing attachment connected thereto.

Referring now to the drawings, the letter A indicates a conventional tractor. The stump remover comprises a framework 10 that is made up of a number of steel pipes which form a rectangular framework. The framework has an aperture 12 in the forward transversely extending frame section 14 for the reception of a pin 16 of a conventional drawbar attachment 18, forming a tractor hitch.

The framework 10 is provided with other transversely extending frame members 20, 22, 24 and 26, and longitudinally extending frame members 30 and 32. Frame members 24 and 26 are rigidly attached to sleeves 25 and 27 which slide on frame members 30 and 32, as explained hereinafter.

Figure 9:
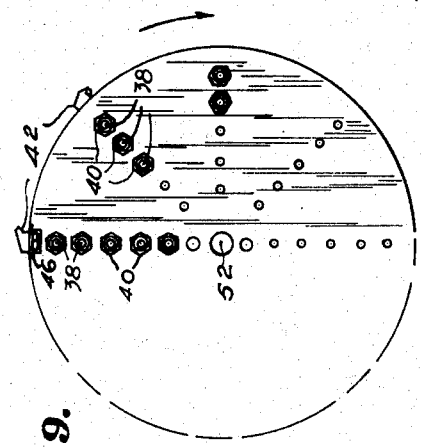
Figure 9 is a rear faced view of the said cutting disk.
Figure 8:
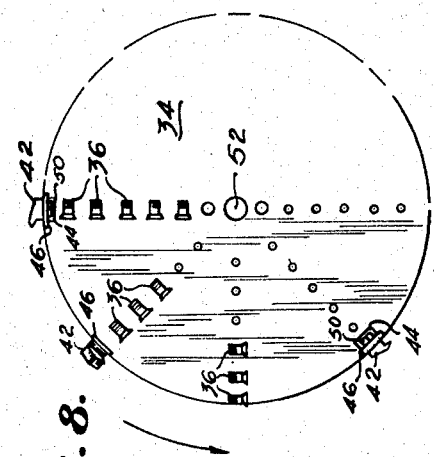
Figure 8 is a front face view of the cutting disk.

The cutting disk 34 comprises a circular disklike member having a plurality of radially arranged teeth 36. Each of these teeth forms one end of a bolt or shank member 38, as seen in Figure 9, having threads which are engageable by nuts 40 whereby to removably support each of these radially mounted teeth in position on the disk. In order to remove a tooth, it is only necessary to unscrew the nut from the threaded end of the bolt and pull on the side shown in Figure 8 and pull the bolt from the disk by pulling one of the teeth 36 that is located on the opposite side of the disk, as shown in Figure 8. In addition to the radially arranged sets of teeth, there are a number of peripheral teeth 42. The disk is provided with a plurality of spaced notches or openings 44, the peripheral portions of which are closed by bridge members 46, which, as shown, are welded so as to extend across the openings 44. Each bridge member is provided with an opening (not shown) for the reception of the bolt or shank member 48, each of which mounts a tooth 42 and whose opposite end is threaded for the reception of a nut 50.

It will be noted that the teeth 42 extend in the direction of rotation of the disk, as shown by the arrows in Figures 8 and 9.

Figure 5:
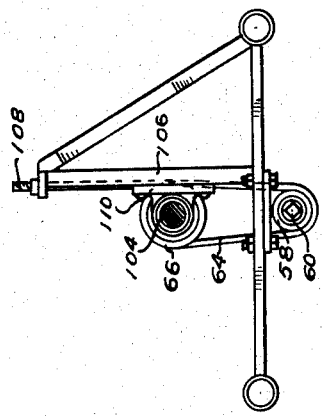
Figure 5 is a side elevational view of the framework and adjusting mechanism for the drive belt of the structure shown in Figure 4.

The cutting disk 34 is fixed by a spline or by other rigidly attaching members to a stub shaft 52 at the rear end of the said shaft 52, and the forward end of this shaft is provided with a universal joint 54 that is connected with a squared or multi-sided shaft 56. Shaft 52 is supported in bearings, not shown, in frame members 24 and 26. Between frame members 20 and 22 and mounting the forward end of the squared shaft is a driven multi-pulley structure indicated at 58, the latter being provided with squared or multi-sided openings 60, as seen in Figure 5, so as to drive shaft 56 while permitting sliding movements of the shaft in openings 60. These pulleys are provided with a guard 62 for the multi-belt drive means shown at 64. The driving pulleys for the multi-belt means are indicated at 66.

Figure 4:
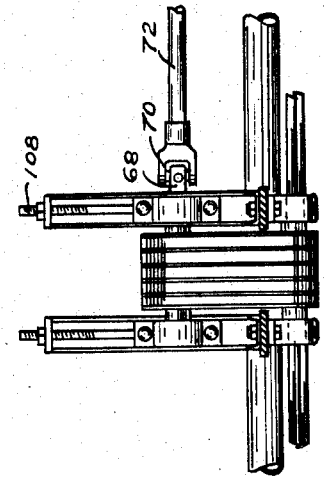
Figure 4 (sheet 1) is an enlarged detail side elevational view of the cutting disk belt drive.

As indicated in Figures 1 and 4, the said driving pulleys 66 are driven by a short shaft 68 whose forward end is attached to a universal joint 70. This universal joint connects the shaft 68 to shaft 72, the forward end of which, as shown in Figure 1, is provided with another universal joint 74, which latter is attached to the power take-off shaft 76 of the tractor.

Connected to the opposite ends of the hydraulic cylinder 84 are rubber hose fluid lines 88 and 90 extending to the tractor. There is a conventional pumping and valve mechanism, not shown, whereby fluid may be led to or away from opposite ends of the cylinder. The control of the valve mechanism is such that when fluid is admitted to one end of the cylinder it is withdrawn from the opposite end of the cylinder and vice versa, whereby the piston in the said cylinder may be moved from one end to the other thereof. The piston (not shown) is rigidly connected to the piston rod 92 in the forward end thereof, and the rear of the piston rod is provided with a fork 94 having a transverse pin 96 for pivotal attachment of the forward end of the carriage 101 comprising frame members 24 and 26 and 98 that mount shaft 52 and the cutting disk 34.

As the piston rod is moved forwardly or rearwardly, as controlled through fluid lines 88 and 90, the carriage and disk cutter may be moved toward or away from the stump to thereby regulate the action of the cutting teeth 36 and 42. During such movements sleeves 25 and 27 slide on frame members 30 and 32, and multisided drive shaft 56 slides in multi-pulley member 58. This structure acts as a stabilizer for the cutting disk and to hold the same in a steady position during the cutting of the stump.

The entire framework and cutting disk may be raised or lowered from the ground by the following structure.

Figure 6:
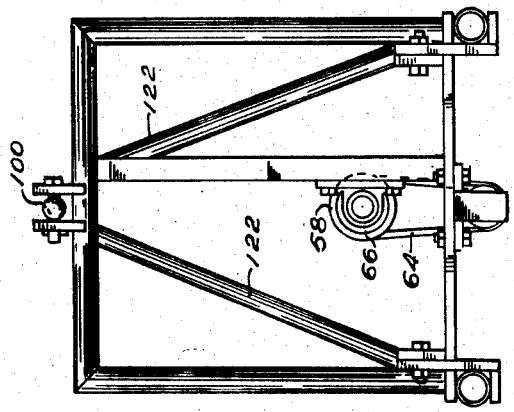
Figure 6 is a view taken on the line 6—6 of Figure 2.

The longitudinal frame members 30 and 32 are pivotally supported on the tractor by pivots 116, one of which is shown in Figure 1. The tractor, such as an International Tractor, is provided with hydraulic lift means comprising arm 100 and adjusting link 118. Arm 100 is connected to the fore and aft ends of the machine by vertical supporting arms 120 and diagonal arms 122, both of which are in engagement with frame members, as seen in Figures 1 and 6.

Rigidly mounted on the frame so as to partially extend over the upper portion of the cutting disk 34 is a shield 102 which may be riveted or otherwise rigidly secured to the framework 10.

Adjustment of the multiple drive belt 64 may be effected by the structure shown in Figure 5 wherein the pulley bearings 104 are adjustably mounted on a vertical framework 106 by means of the screw bolts 108. Each screw bolt is provided with a lower end, not shown, which engages the bearing support 110 whereby the bearing support and the pulley bearings 104 housed thereby may be adjustable in a vertical direction.

Figure 7:
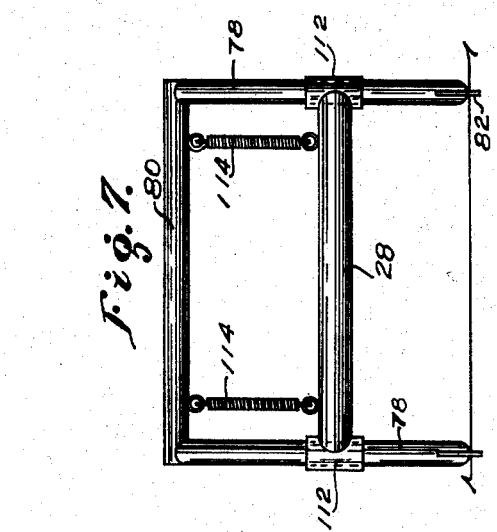
Figure 7 is a rear elevational view of the framework with the cutting disk omitted and related parts omitted for the sake of clarity.

As seen in Figures 1 and 7, each longitudinal frame member 30 and 32 is attached rigidly to a sleeve 112, the sleeves being connected to each other by the end frame member 28 as seen in Fig. 7. These sleeves slide on a pair of vertical supports 78 having an upper connecting bar 80. The lower ends of the supports 78 are supported by the stabilizer plates or shoes 82 that ride on the ground. Springs 114 serve to suspend the end of the frame on the vertical supports 78 in such manner as to permit the frame end to be resiliently suspended therefrom and to move up and down as the sleeves 112 slide on the supports 78.

It will be appreciated that the stump remover attachment is pulled by the tractor, and that the cutting disk is driven by the take-off drive from the tractor. Additionally, fluid for the hydraulic cylinder 84, including a pump not shown, is furnished by the tractor A.

An important feature of the invention is the belt drive illustrated in Figures 1, 4, 5 and 6. Should the cutting disk become slowed down when cutting a stump composed of hard wood, or for any other reason, the belt drive permits slippage between the shaft 72 and 76, whereby to prevent stalling of the drive or injury to the parts, including the teeth 36 and 42 of the cutting disk 34.

The above description and drawings disclosed a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A stump removing machine adapted for connection to a tractor, comprising a longitudinal framework extending in the direction of movement of the tractor, a rotating cutting disk having a plurality of teeth thereon and means for rotating the same including a drive shaft, means for mounting said cutting disk on said framework with said disk in a plane substantially transverse to the line of movement of said machine, and manually controlled means, separate from said means for rotating the cutting disk, for adjusting said means for mounting said cutting disk longitudinally of said framework including a fluid cylinder on said framework having a piston rod connected to said cutting disk whereby to adjust by fluid means the position of said cutting disk in a longitudinal direction along said framework and thereby adjust the position of said disk cutting teeth with relation to said stump.

2. The structure of claim 1 wherein said means for rotating said cutting disk further includes belt drive means connected to said drive shaft.

3. The structure of claim 1 wherein said means for mounting said disk on said framework further includes a carriage extending transversely of the line of movement of said machine.

4. The structure of claim 3 wherein said framework includes a plurality of longitudinally extending pipes, said carriage having sleeves slidably engaging said longitudinal pipes.

5. The structure of claim 2 wherein said means for rotating said drive shaft further includes a plurality of pulleys, said drive belt means being mounted on said pulleys, one of said pulleys having a slidable driving connecting means with said disk drive shaft.

6. The structure of claim 1 wherein means is provided for raising and lowering said framework and the cutting disk supported thereby from said tractor.

7. The structure of claim 1 wherein said framework includes longitudinal frame members having ends located adjacent said cutting disk and means for resiliently supporting the ends of said framework.

8. The structure of claim 7 wherein said last named means includes a plurality of vertical supports and means connecting said vertical supports to the ends of said longitudinal frame members, and cushioning means for connecting the vertical supports to the ends of the longitudinal frame members.

9. The structure of claim 8 wherein said cushioning means comprises at least one spring, a pair of sleeves vertically slidable on said vertical supports, and an end frame member connecting said sleeves, spring, and longitudinal frame members, said vertical frame members having a connecting bar, said springs being connected to said bar.

References Cited in the file of this patent

UNITED STATES PATENTS

| | | |
|---|---|---|
| 1,321,044 | Hurd | Nov. 4, 1919 |
| 1,467,430 | Hurd | Sept. 11, 1923 |
| 2,601,366 | Chapman | June 24, 1952 |
| 2,820,493 | Davis | Jan. 21, 1958 |